(12) United States Patent
Martinet et al.

(10) Patent No.: US 7,671,568 B2
(45) Date of Patent: Mar. 2, 2010

(54) METHOD OF CHARGING A LITHIUM-ION BATTERY COMPRISING A NEGATIVE ELECTRODE

(75) Inventors: Sebastien Martinet, Grenoble (FR); Frederic Le Cras, Notre Dame de l'Osier (FR); Dominique Perrin, Fontaine (FR); Djamel Mourzagh, Fontaine (FR)

(73) Assignee: Commissariat a l'Energie Atomique, Paris (FR)

( * ) Notice: Subject to any disclaimer, the term of this patent is extended or adjusted under 35 U.S.C. 154(b) by 359 days.

(21) Appl. No.: 11/630,001

(22) PCT Filed: Jun. 29, 2005

(86) PCT No.: PCT/FR2005/050514

§ 371 (c)(1),
(2), (4) Date: Dec. 19, 2006

(87) PCT Pub. No.: WO2006/097586

PCT Pub. Date: Sep. 21, 2006

(65) Prior Publication Data

US 2008/0272740 A1   Nov. 6, 2008

(30) Foreign Application Priority Data

Jul. 2, 2004   (FR) .................................. 04 51413

(51) Int. Cl.
*H02J 7/04* (2006.01)
*H02J 7/06* (2006.01)
*H02J 7/16* (2006.01)

(52) U.S. Cl. ...................... 320/157; 320/156; 320/164

(58) Field of Classification Search ................ 320/127, 320/128, 135, 148, 156, 157, 160, 161, 162, 320/164; 429/50, 122, 231.1, 231.3, 231.5, 429/221, 223, 224; 423/306, 594.2, 594.4, 423/594.6, 594.15, 598
See application file for complete search history.

(56) References Cited

U.S. PATENT DOCUMENTS

| | | | | |
|---|---|---|---|---|
| 4,639,656 A | * | 1/1987 | Mukai | 320/155 |
| 5,897,973 A | * | 4/1999 | Stephenson et al. | 429/50 |
| 6,316,145 B1 | * | 11/2001 | Kida et al. | 429/231.5 |
| 6,377,030 B1 | * | 4/2002 | Asao et al. | 320/161 |
| 6,395,425 B1 | * | 5/2002 | Kanno et al. | 429/220 |
| 6,455,194 B1 | * | 9/2002 | Maleki et al. | 429/217 |
| 6,475,673 B1 | * | 11/2002 | Yamawaki et al. | 429/231.5 |
| 6,534,957 B2 | * | 3/2003 | Shibuya et al. | 320/160 |
| 6,749,967 B2 | * | 6/2004 | Li et al. | 429/231.95 |
| 6,841,304 B2 | * | 1/2005 | Michot et al. | 429/307 |
| 7,220,516 B2 | * | 5/2007 | Oosawa et al. | 429/210 |
| 2004/0013946 A1 | * | 1/2004 | Abe et al. | 429/326 |

(Continued)

FOREIGN PATENT DOCUMENTS

EP   0 797 283   9/1997

(Continued)

*Primary Examiner*—Jessica Han
*Assistant Examiner*—Emily Pham
(74) *Attorney, Agent, or Firm*—Oblon, Spivak, McClelland, Maier & Neustadt, L.L.P.

(57) ABSTRACT

The present invention relates to a method for charging a lithium-ion accumulator with a negative electrode at an operating potential larger than 0.5 volts relatively to the Li+/Li pair, which comprises a first charging step at a constant voltage between 2 volts and 5 volts.

10 Claims, 2 Drawing Sheets

U.S. PATENT DOCUMENTS

| | | | |
|---|---|---|---|
| 2004/0023117 A1* | 2/2004 | Imachi et al. | 429/231.95 |
| 2004/0029011 A1 | 2/2004 | Ravet et al. | |
| 2004/0096745 A1* | 5/2004 | Shibano et al. | 429/322 |
| 2004/0106046 A1* | 6/2004 | Inda | 429/322 |
| 2005/0221168 A1* | 10/2005 | Dahn et al. | 429/105 |

FOREIGN PATENT DOCUMENTS

| | | |
|---|---|---|
| EP | 0 981 194 | 2/2000 |
| JP | 2000 106187 | 4/2000 |
| WO | 99 50925 | 10/1999 |

\* cited by examiner

METHOD OF CHARGING A LITHIUM-ION BATTERY COMPRISING A NEGATIVE ELECTRODE

TECHNICAL FIELD

The invention relates to a method for charging a lithium-ion accumulator with a negative electrode at an operating potential larger than 0.5 V relatively to the Li+/Li pair.

The field of the invention is that of accumulators and notably that of chargers for accumulators and their associated charging procedures. The invention more particularly relates to a charger associated with a new type of lithium-ion or Li-ion accumulators so-called <<power Li-ion accumulators>>, where the electrode may be liquid, gelled, polymeric or in a molten salt.

STATE OF THE PRIOR ART

Each accumulator (Ni—Cd, Ni-MH, or Li-ion) technology has its own charging procedure with end-of-charging detection which is optimized according to the chemistry of the accumulator.

Patent application FR 2 733 093 thus describes a method for charging a rechargeable accumulator, and more particularly a lithium-ion (Li-ion) accumulator, which comprises the following steps:
  charging the DC accumulator for a first predetermined time;
  interrupting the charging current for a second predetermined time;
  measuring the open circuit voltage of the accumulator during the second determined time;
  comparing the measured voltage with a reference voltage; and
  repeating the steps above-if the measured voltage is less than the reference voltage.

Alkaline accumulators (Ni—Cd and Ni-MH) are charged with a constant current with dE/dt or dT/dt or t (E: energy; T: temperature; t: time) end-of-charging detection.

Figure 1A:
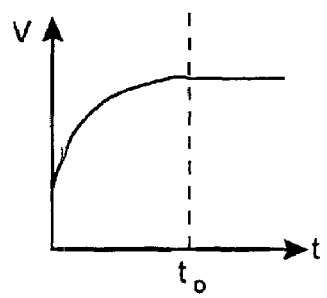
Figure 1B:
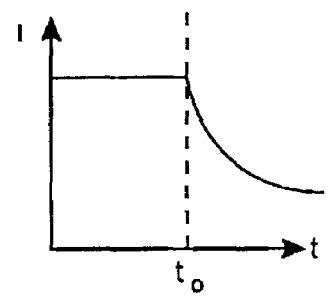

Present lithium-ion accumulators ($LiCoO_2$/graphite technology) are recharged according to a procedure illustrated in FIGS. 1A and 1B, with a first step with constant current until time to (with a threshold voltage), and then with a second step with constant voltage.

Such a procedure was developed in order to take into account the fact that these accumulators comprise a negative graphite electrode, the operating potential (100 mV/Li+/Li typically) of which is very close to that for depositing lithium metal. Consequently, at the end of charging, the negative graphite electrode can no longer be charged with a constant current, at the expense of forming lithium dendrites.

The first step therefore ends for a threshold voltage of 4.1 V for example. During the second step, the voltage of the accumulator is kept equal to this threshold voltage, so that the end of charging may be provided with a gradually decreasing current. Charging then takes place either when the current becomes lower than a threshold current (typically $I_n/20$), or when the total time of the two steps is longer than a certain value (typically between 1 hour 30 minutes and 2 hours).

The current $I_n$ considered above is the rated current with which a full charge of the capacity of the battery may be obtained in 1 hour.

With Li-ion accumulators based on a negative graphite electrode, it is not possible to perform charging directly starting at a constant voltage, without any control or limitation of the current. The current might then reach values much larger than the maximum current recommended by most manufacturers: this maximum current actually is of the order of $2 \times I_n$, for example 2 amperes for a 1 Ah accumulator.

If the example of a 500 mAh accumulator with an internal resistance of 50 mOhm is taken, which are the standard values for commercial accumulators of mobile telephones, directly passing to a constant voltage of 4.1 V (end-of-charging voltage) would lead to a current peak of more than 10 amperes for an accumulator initially at 3.6 V before charging.

Such a current peak may have the following drawbacks:
  short-circuiting the accumulator by depositing lithium dendrites instead of inserting Li+ions during the charging phase,
  heat runaway of the accumulator may lead to opening of the safety vent with fumes, or even a flame, or even an explosion in the worst case,
  in the best case, substantial reduction in the lifetime of the accumulator, with a loss of capacity per cycle, two to three times larger than the 0.04% per cycle required for an application to the mobile telephone.

Such drawbacks are mainly due to the fact that the insertion/de-insertion potential of the lithium ions into the graphite is only very slightly larger than that of the lithium metal deposit, the difference being of the order of 100 mV. Consequently, at a very strong current, the potential of the graphite-based negative electrode becomes considerably less than the lithium deposit potential.

There results a deposit of lithium, possibly as dendrites, rather than insertion of the lithium ions into the graphite.

Because of these limitations relative to the maximum charge in current, these lithium-ion accumulators should be charged for more than an hour, or even for two to three hours.

The object of the present invention is to find a remedy to these drawbacks by proposing a method for charging a lithium-ion accumulator for a new generation of so-called <<power>> accumulators, for which charging is directly achieved at constant voltage, without any limitation on the charging current.

DISCUSSION OF THE INVENTION

The present invention relates to a method for charging a lithium-ion accumulator with a negative electrode at an operating potential larger than 0.5 V relatively to the Li+/Li pair, characterized in that it comprises a first charging step at a constant voltage between 2 volts and 5.

Advantageously, this constant voltage is less than a limiting value which may be equal to 3.5 volts, or be characterized by the limiting value of a threshold voltage for which the ratio of the discharge capacity over the charge capacity at constant current is less than 99%.

Advantageously, the negative electrode of the Li-ion accumulator is a negative electrode based on $Li_4Ti_5O_{12}$. The charging time is less than 5 minutes.

The accumulator may be a $LiMO_2$ type accumulator where M=Mn, Co, Ni or a mixture of these materials, with a constant voltage larger than 2.7 volts. The accumulator may also be an accumulator of the $LiM'PO_4/Li_4Ti_5O_{12}$ type, with a constant voltage larger than 2.2 volts, where M'=Fe, Mn, Co or mixtures thereof.

With the method of the invention, the charging time of the accumulator may be significantly reduced, and this without reducing the lifetime of the latter by a charging yield close to 100% (discharge capacity and charge capacity ratio).

SHORT DESCRIPTION OF THE DRAWINGS

FIGS. 1A and 1B respectively illustrate a curve of the voltage versus time, and a curve of the current versus time in a charging procedure of an accumulator of the known art.

Figure 2A:
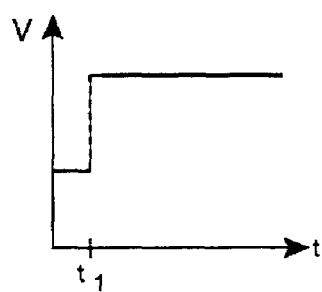
Figure 2B:
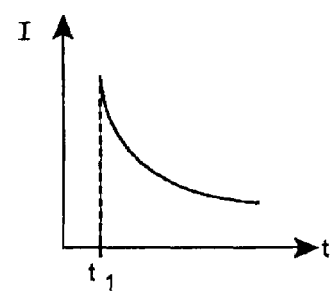

FIGS. 2A and 2B respectively illustrate a curve of the voltage versus time and curve of the current versus time for the method of the invention.

Figure 3:
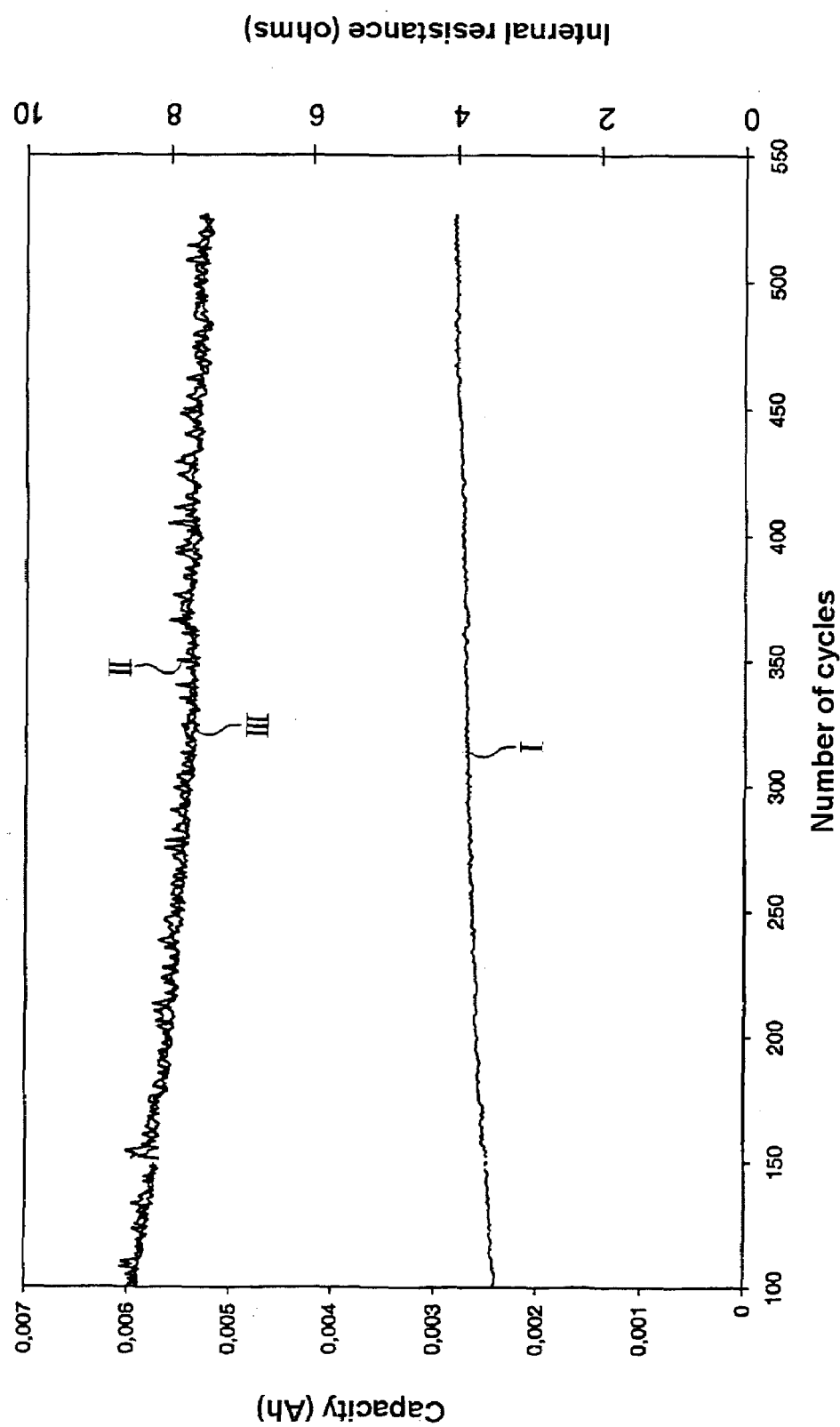

FIG. 3 illustrates the change in capacity for a 8 mAh LiFePO$_4$/Li$_4$Ti$_5$O$_{12}$ accumulator, versus the number of cycles, by using the method of the invention.

DETAILED DISCUSSION OF PARTICULAR EMBODIMENTS

The present invention relates to a method for charging a new lithium-ion accumulator based on a negative electrode with a high potential relatively to lithium metal, for example a lithium-ion accumulator with a negative lithiated titanium spinel (Li$_4$Ti$_5$O$_{12}$) electrode or a lithium-ion accumulator of the type LiFePO$_4$/Li$_4$Ti$_5$O$_{12}$.

This method, as illustrated in FIGS. 2A and 2B, only comprises one step, or a succession of steps, at constant voltage with a variable frequency and duration, from time $t_1$. The value of this constant voltage is adjusted between 2 volts and 5 volts-according to the nature of the materials used: thus, this value is between 2.5 volts and 4 volts for a LiMO$_2$/Li$_4$Ti$_5$O$_{12}$ type accumulator, with M=Ni, Co, Mn or a mixture of these three. This value is between 2 volts and 3.5 volts for a LiFePO$_4$/Li$_4$Ti$_5$O$_{12}$ pair.

This constant voltage value is less than a limiting value for preventing any overcharging reaction of the accumulator. The accumulator may withstand such a limiting voltage without oxidization of the solvent at the positive electrode and without deposit of lithium metal at the negative electrode. Within the scope of the invention, this limiting value is of the order of 3.5 volts, whether for an accumulator of type LiMO$_2$/Li$_4$Ti$_5$O$_{12}$ or LiM'PO$_4$/Li$_4$Ti$_5$O$_{12}$, where M'=Fe, Mn, Co or mixtures thereof.

This limiting value may also be characterized by the limiting value of a threshold voltage for which the ratio of the discharged capacity over the charged capacity at constant current is less than a given ratio, for example 99%.

With the method of the invention, the charging time of the accumulator may be significantly reduced, without any detrimental effect on its lifetime. Typically, gains of more than 25% are observed, as compared with the methods of the prior art, for charging times required for reaching a same charging level.

With the method of the invention, very high current peaks may be withstood, allowing recharging processes in a few seconds (200 to 300 C). It is therefore only possible in the case of a high potential negative electrode, since, unlike conventional accumulators with a graphite-based negative electrode, deposition of lithium metal is thereby ruled out. This is the case of a negative electrode of the Li$_4$Ti$_5$O$_{12}$ type, the equilibrium potential of which (for a Li$_4$Ti$_5$O$_{12}$/Li$_7$Ti$_5$O$_{12}$ pair) is 1.55 volts relatively to the Li$^+$/Li pair. The voltage of the accumulator may therefore vary by more than 1 volt relatively to its equilibrium voltage without risking the formation of lithium dendrites.

For a lithium-ion accumulator with a capacity of 500 mAh and an internal resistance of 50 mOhms, the peak current may thereby reach 20 amperes, without any particular risks, and without causing any overcharging reactions.

EXEMPLARY EMBODIMENT

1) Making a LiMn$_2$O$_4$/Li$_4$Ti$_5$O$_{12}$ Prototype in a Flexible Package

Accumulators are made by associating a positive LiMn$_2$O$_4$ electrode on an aluminum collector, a microporous separator of the Celgard® type, and a negative Li$_4$Ti$_5$O$_{12}$ type electrode on an aluminum collector. These three components are dried in a vacuum oven beforehand, before their being assembled into a flexible accumulator in an argon glove box.

Before sealing the accumulator, an electrolyte of the EC/DEC (EC=ethylene carbonate, DEC=diethyl carbonate) (LP40-Merck) type is added for activating the accumulator.

In a first phase, a method from the known art is used. An accumulator of this type is first of all submitted to charging/discharging cycles at constant current (with same charging and discharging rates, and a charging voltage threshold set to 2.9 volts). The rates are increased from I$_n$ to 50×I$_n$, by passing by 2×I$_n$, 5×I$_n$, 10×I$_n$ and 20×I$_n$, as illustrated in the table 1 below. This table illustrates the power performances of an LiMn$_2$O$_4$/Li$_4$Ti$_5$O$_{12}$ accumulator. At 10×I$_n$, 70% of the capacity of the accumulator is charged, which corresponds to charging for 4 minutes in 12 s.

In a second step, by comparison, the method of the invention is used for an identical accumulator. Charging at constant voltage of 2.9 volts is imposed for a duration of 3 minutes. The charged capacity also attains 70%, but this time, the charging level is obtained within only 3 minutes, as illustrated in Table 1 below.

Consequently, with the present invention, it is possible to gain 28% on the charging duration. Moreover, these performances are maintained over more than 2,000 cycles, with less than 0.01% of losses per cycle.

TABLE 1

|  | State of the art | | | | | | Invention |
|---|---|---|---|---|---|---|---|
| Charging/discharging rate | In | 2 × In | 5 × In | 10 × In | 20 × In | 50 × In | Special |
| Charge capacity % | 97% | 93% | 80-85% | 65-70% | 50-55% | 30-35% | 65-70% |
| Charging time | 1 h | 28 min | 10 min | 4 min | 1 min 40 s | 20 s-25 s | 3 min |

2) Making a LiFePO$_4$/Li$_4$Ti$_5$O$_{12}$ Prototype with a Capacity 8 mAh

An accumulator is made by associating a positive LiFePO$_4$ electrode on an aluminium collector, a microporous separator of the Celgard® type and a negative Li$_4$Ti$_5$O$_{12}$ type electrode on an aluminium collector. The three components are dried in an oven, in vacuo, beforehand, before their being assembled into a button cell in an argon glove box.

Before sealing the accumulator, the EC/DEC (LP40-Merck) type electrolyte is added for activating the accumulator.

The accumulator is then submitted to more than 500 cycles, each cycle corresponding to charging according to the method of the invention (at a constant voltage of 2.9 volts for 3 minutes), followed by discharging at constant current (20 C.).

At the beginning, the accumulator charges and then discharges 6 mAh: 75% of the capacity is therefore charged within 3 minutes. After more than 500 cycles, the exchanged capacity still exceeds 5.2 mAh, as illustrated in FIG. 3. On this figure, curve I corresponds to the internal resistance, curve II corresponds to the charging capacity, and curve III to the discharging capacity. There is thus a loss of 13.3% of capacity within 500 cycles, which is better than the mobile telephone specifications (20% losses within 500 cycles).

The invention claimed is:

1. A method for charging a lithium-ion power accumulator with a negative electrode at an operating potential larger than 0.5 volts relative to the $Li^+/Li$ pair,
   which comprises at least one charging step directly at a constant voltage between 2 volts and 5 volts with a variable frequency and variable duration from a determined time;
   wherein the power accumulator is an $LiMO_2/Li_4Ti_5O_{12}$ type accumulator where M =Mn, Co, Ni or a mixture of these materials, or is a $LiM'PO_4/Li_4Ti_5O_{12}$ type accumulator, where M'=Fe, Mn, Co or mixtures thereof.

2. The method according to claim 1, wherein the constant voltage is less than a limiting value.

3. The method according to claim 2, wherein this limiting value is of the order of 3.5 volts.

4. The method according to claim 2, wherein this limiting value is characterized by the limiting value of a threshold voltage for which the ratio of the discharged capacity over the charged capacity at constant current is less than 99%.

5. The method according to claim 1, wherein the negative electrode of the Li-ion accumulator is a negative electrode based on $Li_4Ti_5O_{12}$.

6. The method according to claim 5, wherein the charging time is less than 5 minutes.

7. The method according to claim 5, wherein the accumulator is a $LiMO_2$ type accumulator where M=Mn, Co, Ni or a mixture of these materials with a constant voltage larger than 2.7 volts.

8. The method according to claim 1, wherein the accumulator is a $LiM'PO_4/Li_4Ti_5O_{12}$ type accumulator with a constant voltage larger than 2.2 volts, where M'=Fe, Mn, Co or mixtures thereof.

9. The method according to claim 1, wherein power accumulator is a $LiMO_2/Li_4Ti_5O_{12}$ type accumulator, where M=Mn, Co, Ni or a mixture of these materials.

10. The method according to claim 1, wherein power accumulator is an $LiM'PO_4/Li_4Ti_5O_{12}$ type accumulator, where M'=Fe, Mn, Co or mixtures thereof.

* * * * *